United States Patent
Chan et al.

(10) Patent No.: US 9,205,330 B2
(45) Date of Patent: Dec. 8, 2015

(54) TEMPORAL RANKING IN VIRTUAL WORLDS

(75) Inventors: Philip S. P. Chan, Wahroonga (AU); Kenneth Sabir, Marrickville (AU)

(73) Assignee: International Business Machines Corporation, Armonk, NY (US)

( * ) Notice: Subject to any disclaimer, the term of this patent is extended or adjusted under 35 U.S.C. 154(b) by 2390 days.

(21) Appl. No.: 11/962,646

(22) Filed: Dec. 21, 2007

(65) Prior Publication Data

US 2009/0160851 A1    Jun. 25, 2009

(51) Int. Cl.
*G09G 5/00* (2006.01)
*A63F 13/30* (2014.01)

(52) U.S. Cl.
CPC .......... *A63F 13/12* (2013.01); *A63F 2300/5533* (2013.01); *A63F 2300/5546* (2013.01); *A63F 2300/638* (2013.01)

(58) Field of Classification Search
USPC ...................................... 345/632, 633; 463/42
See application file for complete search history.

(56) References Cited

U.S. PATENT DOCUMENTS

| | | | | |
|---|---|---|---|---|
| 6,569,011 | B1 * | 5/2003 | Lynch et al. ....................... 463/1 |
| 7,396,281 | B2 * | 7/2008 | Mendelsohn et al. ........... 463/42 |
| 2005/0192864 | A1 * | 9/2005 | Ganz ................................ 705/14 |
| 2006/0100018 | A1 * | 5/2006 | Ganz ................................ 463/42 |
| 2006/0293103 | A1 * | 12/2006 | Mendelsohn .................... 463/42 |
| 2007/0035549 | A1 * | 2/2007 | Jung et al. ....................... 345/474 |
| 2007/0038559 | A1 * | 2/2007 | Jung et al. ......................... 705/39 |
| 2007/0101276 | A1 * | 5/2007 | Yuen .............................. 715/757 |
| 2008/0092065 | A1 * | 4/2008 | Jung et al. ...................... 715/757 |
| 2009/0143883 | A1 * | 6/2009 | Pines et al. ....................... 700/92 |
| 2009/0307609 | A1 * | 12/2009 | Ganz et al. ..................... 715/753 |

OTHER PUBLICATIONS

Bjork et al., Pirates! Using the Physical World as a Game Board, PLAY research studio, Interactive Institute, pp. 1-8.*

* cited by examiner

*Primary Examiner* — M Good Johnson
(74) *Attorney, Agent, or Firm* — Steven M. Greenberg, Esq.; CRGO Law

(57) ABSTRACT

Embodiments of the present invention address deficiencies of the art in respect to virtual world navigation and provide a method, system and computer program product for applying temporal rankings to elements in a virtual world. In an embodiment of the invention, a method for temporally ranking locations in a virtual world can be provided. The method can include timing a duration of visit for different locations in a virtual world, computing a temporal score for the different locations, and displaying a ranking of the locations by temporal score. For instance, computing a temporal score for the different locations can include computing a sum of durations for each of the different locations, or computing an average of durations for each of the different locations, to name two examples. Optionally, computing a temporal score for the different locations also can include filtering the durations according to a date or time range.

20 Claims, 1 Drawing Sheet

TEMPORAL RANKING IN VIRTUAL WORLDS

BACKGROUND OF THE INVENTION

1. Field of the Invention

The present invention relates to virtual reality and more particularly to virtual world management over a computer communications network.

2. Description of the Related Art

As the progenitor to the modern virtual world, the multi-user dungeon provided a revolutionary experience for its first participants more than three decades ago. The multi-user dungeon was and continues to be a multi-player computer game that combines elements of role-playing, first person shooter and social chat. The multi-user dungeon generally executes in a central server configured for simultaneous access by participants over a global computer communications network like the Internet. The multi-user dungeon historically has been text-driven where the immediate environment is presented to participants in text form, and participants engage in actions in the environment through textual directives mimicking the postings of an instant messenger. Non-player characters in the multi-user dungeon can be automated and the actions of the non-player characters can be broadcast to the participants also as textual postings.

Like a multi-user dungeon, virtual reality allows a user to interact with a computer-simulated environment; however in virtual reality, the virtual environment is visual in nature and can be displayed either on a computer screen or through customized or stereoscopic displays. Advanced modes of virtual reality further incorporate other sensory presentation elements, including audio elements and tactile elements. Generally, end-users interact with a virtual reality environment through traditional keyboard and mouse movements, though other input means are provided occasionally including gyroscopic handheld devices and gloves, and joysticks. Consistent throughout all virtual reality experiences, the virtual reality environment reflects the real world environment and has proven invaluable in commercial applications such as flight simulation or combat training.

The virtual world builds upon the multi-user dungeon and virtual reality in order to provide a computer-based simulated environment in which participants interact with one another through three-dimensional visually displayable surrogates referred to as avatars. In this regard, participants "inhabit" the virtual world through their respective avatars. In as much as avatars can freely roam the bounds of the virtual world, virtual worlds expand the boundaries of the multi-user dungeon and permit participants to truly enjoy freedom of motion and exploration within the virtual world. To date, virtual worlds have become such close approximations to reality that the lines of reality have become blurred to the extent that many participants treat ordinary interactions in the virtual world with the same degree of seriousness as those same interactions in the real world.

In that the virtual world supports and relies upon the participation of multiple different participants, there is a social aspect to the virtual world. To wit, the behavior of a set of participants oftentimes can influence the behavior of other participants, just as would be the case in the real world. The virtual world can be vast and can provide a greater degree of accessibility to different parts of the virtual world than the analogous instance in the real world because there are not time-space limitations in the virtual world as there is in the real world. Accordingly, observing the behavior and movements of a likeminded participant in the virtual world can facilitate the navigation of the virtual world for a participant by eliminating the guess-work of which portions of the virtual world are likely to be interesting.

BRIEF SUMMARY OF THE INVENTION

Embodiments of the present invention address deficiencies of the art in respect to virtual world navigation and provide a novel and non-obvious method, system and computer program product for applying temporal rankings to elements in a virtual world. In an embodiment of the invention, a method for temporally ranking locations in a virtual world can be provided. The method can include timing a duration of visit for different locations in a virtual world, computing a temporal score for the different locations, and displaying a ranking of the locations by temporal score. For instance, computing a temporal score for the different locations can include computing a sum of durations for each of the different locations, or computing an average of durations for each of the different locations, to name two examples. Optionally, computing a temporal score for the different locations also can include filtering the durations according to a date or time range.

In another embodiment of the invention, a virtual world data processing system can be provided. The system can include a virtual world executing in a host server and configured for communicative coupling to computing clients over a computer communications network. The system also can include locations persisting in the virtual world and temporal ranking logic coupled to the virtual world. The logic can include program code enabled to time a duration of visit for the different locations in the virtual world, to compute a temporal score for the different locations, and to display a ranking of the locations in the virtual world by temporal score. In one aspect of the embodiment, the locations can include virtual locations selected from the group consisting of stores, houses, restaurants, parks, theaters, social clubs, office buildings, offices and rooms. Alternatively, the virtual locations can include a social taxonomy such as a social interest forum for social interests including common musical tastes, fan clubs and the like.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for temporally ranking locations in a virtual world. In accordance with an embodiment of the present invention, a number of virtual visitors visiting different locations in a virtual world can be recorded along with a duration of time spent visiting each different location. Thereafter, the duration of time spent for each visitor for each different location can be combined with other recorded durations of time for different virtual visitors for the same location in order to generate a temporal score for the location. Finally, the temporal scores for different locations in the virtual world can be compared to identify more popular locations in the virtual world.

Figure 1:
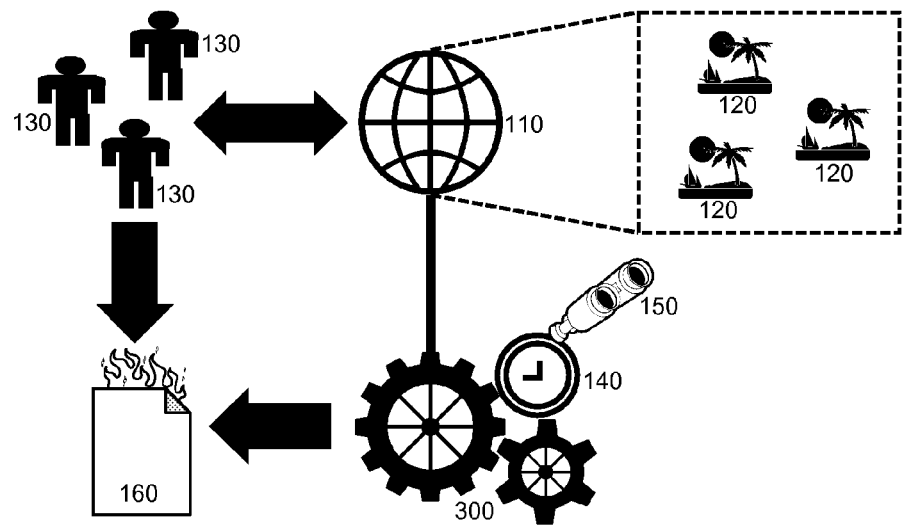
FIG. 1 is a pictorial illustration of a process for temporally ranking locations in a virtual world.

In further illustration, FIG. 1 pictorially illustrates a process for temporally ranking locations in a virtual world. As shown in FIG. 1, a virtual world 110 can be provided to include multiple different locations 120 such as stores, houses, restaurants, parks, theaters, social clubs, office buildings, offices, rooms and the like. The virtual world 110 further can be provided to permit interactions between virtual visitors 130 and the locations 120. In this regard, as it is well-known in the art, the virtual visitors 130 can be visually and logically represented in the virtual world 110 as avatars granted the freedom of spatial movement throughout the virtual world 110.

Notably, a temporal ranking processor 300 can be coupled to the virtual world 110 and communicatively coupled to the different locations 120. The temporal ranking processor 300 can include a monitor 150 configured to detect when individual ones of the virtual visitors 130 visit individual ones of the locations 120. The temporal ranking processor 300 further can include a timer 140 configured to time a duration in which each of the virtual visitors 130 visits with the different ones of the locations 120. In consequence, the temporal ranking processor 300 can produce a temporal ranking 160 of the different locations 120 in accordance with a number of visits by the virtual visitors 130 to the different locations 120 and also a duration in which the virtual visitors 130 visit with the different locations 120.

Figure 2:
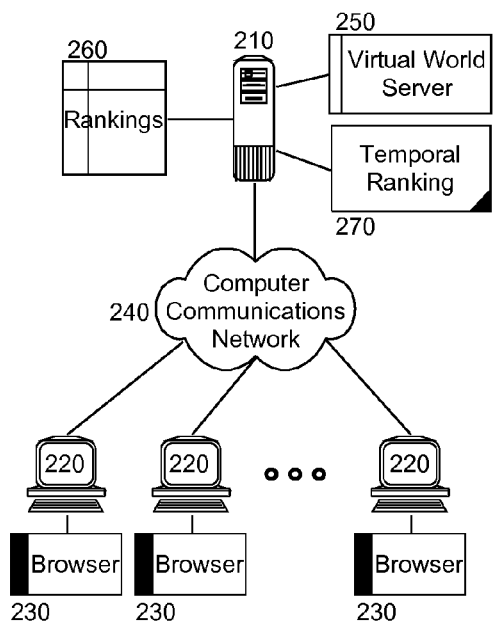
FIG. 2 is a schematic illustration of a virtual world data processing system configured for temporally ranking locations in a virtual world; and, FIG. 3 is a flow chart illustrating a process for temporally ranking locations in a virtual world.

The process described herein can be embodied within a virtual world data processing system. In illustration, FIG. 2 schematically depicts a virtual world data processing system configured for temporally ranking locations in a virtual world. The system can include a host server 210 communicatively coupled to different computing clients 220 over computer communications network 240. The host server 210 can support the operation of a virtual world server 250 configured to generate a virtual world and provide access thereto over the computer communications network 240 to end users interacting with the virtual world by way of a content browser 230. Each of the end users can be represented in the virtual world with a respective avatar.

Notably, temporal ranking logic 270 can be coupled to the virtual world server 250 by way of the host server 210. The temporal ranking logic 270 can include program code enabled to track virtual visitors to different locations in the virtual world provided by the virtual world server. The program code of the temporal ranking logic 270 further can be enabled to time a duration of each visit to a location by a virtual visitor in the virtual world. Consequently, the program code of the temporal ranking logic 270 can produce a set of rankings 260 for the different locations. The rankings can range from a list of most popular locations, to a detailed listing of durations of visits, to a listing of an average duration of visits. Of course, the rankings can be filtered by time of day, day of week or month of year, and period comparisons can be provided comparing rankings from one period to the next.

Figure 3:
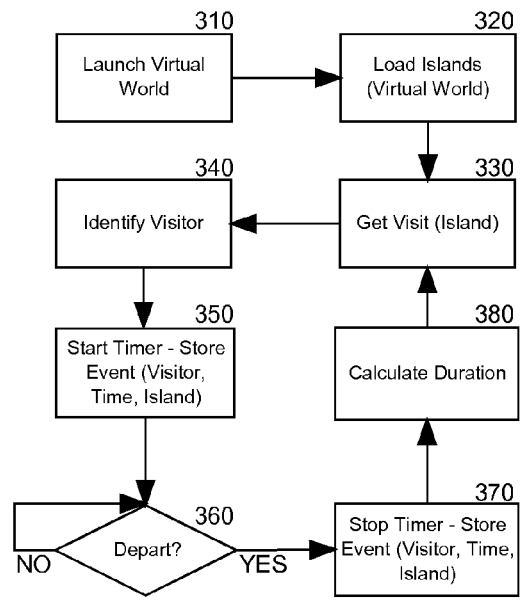

In further illustration of the operation of the temporal ranking logic 270, FIG. 3 is a flow chart illustrating a process for temporally ranking locations in a virtual world. Beginning in block 310, a virtual world can be launched for interaction with different end users and in block 320, different locations can be loaded within the virtual world, such as different stores, houses, restaurants, parks, theaters, social clubs, office buildings, offices, rooms and the like. In block 330, a visit can be detected by an end user in a location in the virtual world. In consequence, in block 340 the visitor to the location can be identified either directly (e.g., by name), or indirectly in terms of demographics (e.g. male, female, age, etc.). In the latter circumstance, the privacy of the visitor to the location can be protected at the discretion of the visitor according to preferences of a security policy for the visitor.

In block 350, a timer can start for the visit and the visit can be stored in connection with the visitor, the time and the location. With the stored information, real-time information pertaining to a most popular location can be readily determined. In decision block 360, so long as the visitor has not left the location, the timer can continue to run. In decision block 360, if it is determined that the visitor has left the location, in block 370 the timer can stop and the departure from the location can be stored in connection with the visitor, the time and the location. Thereafter, in block 380 the duration of the visit to the location can be computed for subsequent reporting, for instance, a list of the "stickiest" locations or most popular locations in the virtual world according to a sum of visit durations for each location, or an average duration of a visit for each location. The process then can repeat through block 330 for a next visit by a visitor to a location in the virtual world.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for temporally ranking locations in a virtual world, the method comprising:
   timing a duration of each visit to each of different locations in a virtual world by participants of the virtual world;
   computing a temporal score for the different locations based on the duration data; and,
   displaying a ranking of the locations by the temporal score.

2. The method of claim 1, wherein computing the temporal score for the different locations, comprises computing a sum of durations for each of the different locations.

3. The method of claim 1, wherein computing the temporal score for the different locations, comprises computing an average of durations for each of the different locations.

4. The method of claim 1, wherein computing the temporal score for the different locations, further comprises filtering the durations according to a date range.

5. The method of claim 1, wherein computing the temporal score for the different locations, further comprises filtering the durations according to a time range.

6. The method of claim 1, further comprising associating an identity of each visitor for each visit with a respective duration of visit for a location in the virtual world.

7. A virtual world data processing system comprising:
   a virtual world executing in a host server and configured for communicative coupling to a plurality of computing clients over a computer communications network;
   a plurality of locations persisting in the virtual world; and,
   temporal ranking logic coupled to the virtual world, the temporal ranking logic comprising program code enabled to time a duration of each visit to each of the different locations in the virtual world by participants of the virtual world, to compute a temporal score for the different locations based on the duration data, and to display a ranking of the locations in the virtual world by the temporal score.

8. The system of claim 7, wherein the locations comprise virtual locations selected from the group consisting of stores, houses, restaurants, parks, theaters, social clubs, office buildings, offices and rooms.

9. The system of claim 7, wherein the locations comprise a social interest forum.

10. The system of claim 7, wherein the program code enabled to compute the temporal score for the different locations, comprises program code enabled to compute a sum of durations for each of the different locations.

11. The system of claim 7, wherein the program code enabled to compute the temporal score for the different locations, comprises program code enabled to compute an average of durations for each of the different locations.

12. The system of claim 7, wherein the program code enabled to compute the temporal score for the different locations, further comprises program code enabled to filter the durations according to a date range.

13. The system of claim 7, wherein the program code enabled to compute the temporal score for the different locations, further comprises program code enabled to filter the durations according to a time range.

14. The system of claim 7, wherein the temporal ranking logic further comprises program code enabled to associate an identity of each visitor for each visit with a respective duration of visit for a location in the virtual world.

15. A computer program product comprising a non-transitory computer usable medium embodying computer usable program code for temporally ranking locations in a virtual world, the computer program product comprising:
   computer usable program code for timing a duration of each visit to each of different locations in a virtual world by participants of the virtual world;
   computer usable program code for computing a temporal score for the different locations based on the duration data; and, computer usable program code for displaying a ranking of the locations by the temporal score.

16. The computer program product of claim 15, wherein the computer usable program code for computing the temporal score for the different locations, comprises computer usable program code for computing a sum of durations for each of the different locations.

17. The computer program product of claim 15, wherein the computer usable program code for computing the temporal score for the different locations, comprises computer usable program code for computing an average of durations for each of the different locations.

18. The computer program product of claim 15, wherein the computer usable program code for computing the temporal score for the different locations, further comprises computer usable program code for filtering the durations according to a date range.

19. The computer program product of claim 15, wherein the computer usable program code for computing the temporal score for the different locations, further comprises computer usable program code for filtering the durations according to a time range.

20. The computer program product of claim 15, further comprising computer usable program code for associating an identity of each visitor for each visit with a respective duration of visit for a location in the virtual world.

* * * * *